United States Patent
Nakatsuka

(10) Patent No.: US 10,412,256 B2
(45) Date of Patent: Sep. 10, 2019

(54) IMAGE READING DEVICE, IMAGE FORMING APPARATUS, AND IMAGE READING METHOD

(71) Applicant: KYOCERA Document Solutions Inc., Osaka-shi, Osaka (JP)

(72) Inventor: Shinji Nakatsuka, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 55 days.

(21) Appl. No.: 15/824,851

(22) Filed: Nov. 28, 2017

(65) Prior Publication Data
US 2018/0152585 A1    May 31, 2018

(30) Foreign Application Priority Data
Nov. 30, 2016    (JP) ................................. 2016-233290

(51) Int. Cl.
*H04N 1/04*    (2006.01)
*H04N 1/047*    (2006.01)
*H04N 1/00*    (2006.01)

(52) U.S. Cl.
CPC ......... *H04N 1/047* (2013.01); *H04N 1/00236* (2013.01); *H04N 1/00816* (2013.01);
(Continued)

(58) Field of Classification Search
None
See application file for complete search history.

(56) References Cited

U.S. PATENT DOCUMENTS 3,804,508 A * 4/1974 Mihajlov ................. G03G 7/00
                                                         399/131
5,714,289 A * 2/1998 Kato ................. G03G 5/14786
                                                        430/49.31
(Continued)

FOREIGN PATENT DOCUMENTS

JP    2006240037 A  *  9/2006
JP    2010114498 A      5/2010
(Continued)

OTHER PUBLICATIONS

Japanese Patent Office, Office Action Issued in Application No. 2016233290, Jun. 25, 2019, 3 pages.

*Primary Examiner* — Cheukfan Lee
(74) *Attorney, Agent, or Firm* — Alleman Hall Creasman & Tuttle LLP

(57) ABSTRACT

An image reading device includes a first image reading portion, a cooling portion, a second image reading portion, and a notification processing portion. The first image reading portion reads an image of a document sheet at a first reading position. The cooling portion cools the document sheet at a cooling position downstream in a feeding direction of the document sheet with respect to the first reading position. The second image reading portion reads an image of the document sheet at a second reading position downstream in the feeding direction with respect to the cooling position. In a case where a difference image different from a first image read by the first image reading portion, the difference image being included in a second image read by the second image reading portion has been detected, the notification processing portion provides a notification that the difference image has been detected.

9 Claims, 6 Drawing Sheets

(52) U.S. Cl.
CPC ......... *H04N 1/00978* (2013.01); *H04N 1/042* (2013.01); *H04N 1/0461* (2013.01); *B65H 2301/5144* (2013.01); *H04N 2201/0458* (2013.01); *H04N 2201/04713* (2013.01)

(56) References Cited

U.S. PATENT DOCUMENTS

| | | | | |
|---|---|---|---|---|
| 5,826,133 | A * | 10/1998 | Saito | H04N 1/203 |
| | | | | 399/2 |
| 8,960,843 | B2 * | 2/2015 | Wilsher | B41J 11/002 |
| | | | | 347/100 |
| 2002/0051243 | A1 * | 5/2002 | Yoshida | H04N 1/33315 |
| | | | | 358/474 |
| 2012/0194875 | A1 * | 8/2012 | Ozaki | H04N 1/40 |
| | | | | 358/448 |
| 2014/0168311 | A1 * | 6/2014 | Wilsher | B41J 11/002 |
| | | | | 347/17 |
| 2014/0168332 | A1 * | 6/2014 | Wilsher | B41J 2/2107 |
| | | | | 347/100 |
| 2014/0171307 | A1 * | 6/2014 | Wilsher | B41J 29/377 |
| | | | | 503/201 |

FOREIGN PATENT DOCUMENTS

| | | | |
|---|---|---|---|
| JP | 2016090947 | A | 5/2016 |
| JP | 2016092735 | A | 5/2016 |

* cited by examiner

G10

| BILL | | JULY 23, 2016 | |
|---|---|---|---|
| 1 | COMPANY NAME | --- K.K. | SEAL |
| 2 | ADDRESS | ---, --- CITY, --- PREFECTURE | |
| 3 | TELEPHONE NUMBER | 0123-456-7890 | |
| 4 | NAME OF COMMODITY | XXX | |
| 5 | UNIT PRICE | ¥12, 345- | |
| 6 | QUANTITY | 10, 000 | |

| | BILL | | |
|---|---|---|---|
| | | JULY 23, 2016 | |
| 1 | COMPANY NAME | ---- K.K. | |
| 2 | ADDRESS | ----, ---- CITY, ---- PREFECTURE | SEAL |
| 3 | TELEPHONE NUMBER | 0123-456-7890 | |
| 4 | NAME OF COMMODITY | XXX | |
| 5 | UNIT PRICE | ¥12,345- | |
| 6 | QUANTITY | 10,000 | |

| | BILL | | |
|---|---|---|---|
| | | (MONTH) (DATE), (YEAR) | |
| 1 | COMPANY NAME | ---- K.K. | |
| 2 | ADDRESS | ----, ---- CITY, ---- PREFECTURE | SEAL |
| 3 | TELEPHONE NUMBER | 0123-456-7890 | |
| 4 | NAME OF COMMODITY | | |
| 5 | UNIT PRICE | | |
| 6 | QUANTITY | | |

IMAGE READING DEVICE, IMAGE FORMING APPARATUS, AND IMAGE READING METHOD

INCORPORATION BY REFERENCE

This application is based upon and claims the benefit of priority from the corresponding Japanese Patent Application No. 2016-233290 filed on Nov. 30, 2016, the entire contents of which are incorporated herein by reference.

BACKGROUND

The present disclosure relates to an image reading device that reads an image from a document sheet, an image forming apparatus that includes the image reading device, and an image reading method.

In an image reading device such as a scanner, images are read from various types of document sheets. For example, in the image reading device, an image may be read from a document sheet, of a text, produced using a writing instrument that enables erasing of writing by heating. Conventionally, a device is known which is capable of determining whether or not the writing instrument has been used for producing the document sheet, on the basis of a result of comparison between an image read from the document sheet having been heated and an image read from the document sheet which has not been heated yet.

SUMMARY

An image reading device according to one aspect of the present disclosure includes a feeding portion, a first image reading portion, a cooling portion, a second image reading portion, a detection processing portion, and a notification processing portion. The feeding portion feeds a document sheet. The first image reading portion reads an image of the document sheet at a predetermined first reading position in a feed path of the document sheet fed by the feeding portion. The cooling portion cools the document sheet to a predetermined first temperature at a cooling position downstream in a feeding direction in which the document sheet is fed by the feeding portion, with respect to the first reading position in the feed path. The second image reading portion reads an image of the document sheet at a second reading position downstream in the feeding direction with respect to the cooling position in the feed path. The detection processing portion detects a difference image different from a first image read by the first image reading portion, the difference image being included in a second image read by the second image reading portion. In a case where the difference image has been detected by the detection processing portion, the notification processing portion provides a notification that the difference image has been detected.

An image forming apparatus according to another aspect of the present disclosure includes the image reading device, and an image forming portion. The image forming portion forms an image on the basis of image data.

An image reading method according to another aspect of the present disclosure is executed by an image reading device that includes a feeding portion that feeds a document sheet, a first image reading portion that reads an image of the document sheet at a predetermined first reading position in a feed path of the document sheet fed by the feeding portion, a cooling portion that cools the document sheet to a predetermined first temperature at a cooling position downstream in a feeding direction in which the document sheet is fed by the feeding portion, with respect to the first reading position in the feed path, and a second image reading portion that reads an image of the document sheet at a second reading position downstream in the feeding direction with respect to the cooling position in the feed path, and the image reading method includes a detection step and a notification step. In the detection step, a difference image different from a first image read by the first image reading portion is detected, the difference image being included in a second image read by the second image reading portion. In the notification step, in a case where the difference image has been detected in the detection step, a notification that the difference image has been detected is provided.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of a second image read by the image processing apparatus according to the embodiment of the present disclosure.

FIG. 6 is a diagram showing an example of a third image read by the image processing apparatus according to the embodiment of the present disclosure.

DETAILED DESCRIPTION

Hereinafter, embodiments of the present disclosure will be described with reference to the accompanying drawings. It is noted that the following embodiment is an example embodying the present disclosure and does not limit the technical scope of the present disclosure.

Structure of Image Processing Apparatus 10

Figure 1:
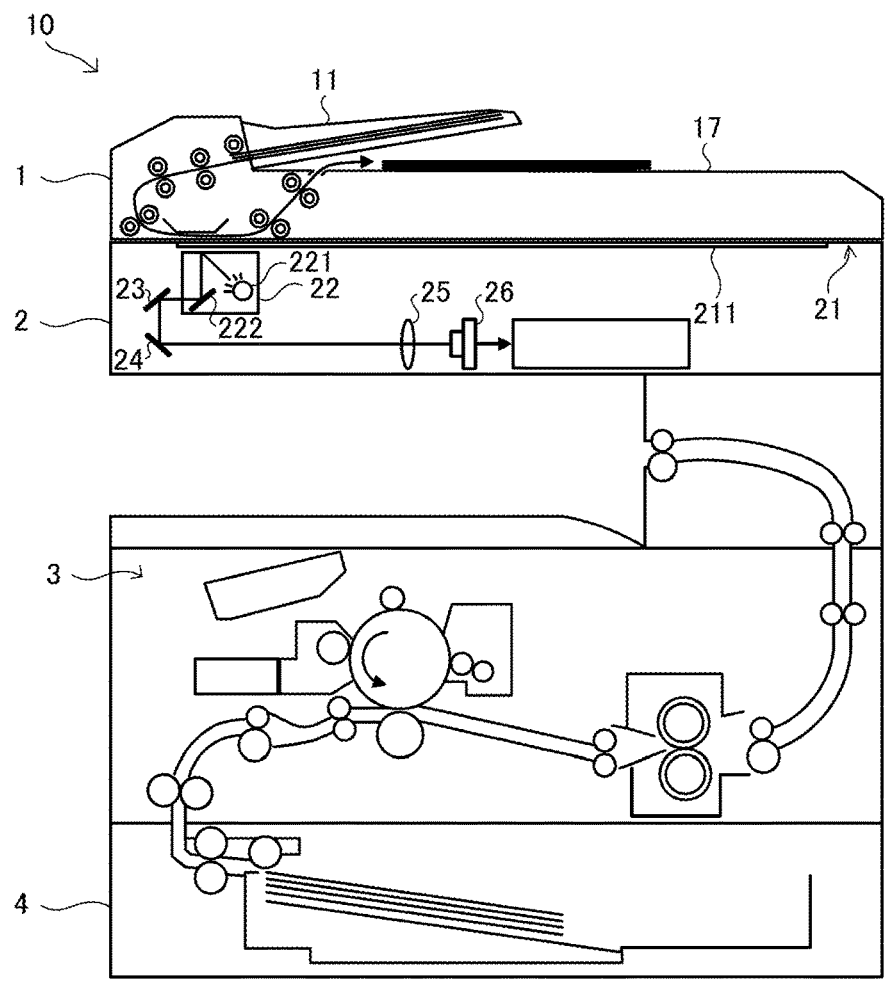
FIG. 1 illustrates a structure of an image processing apparatus according to an embodiment of the present disclosure.
Figure 2:
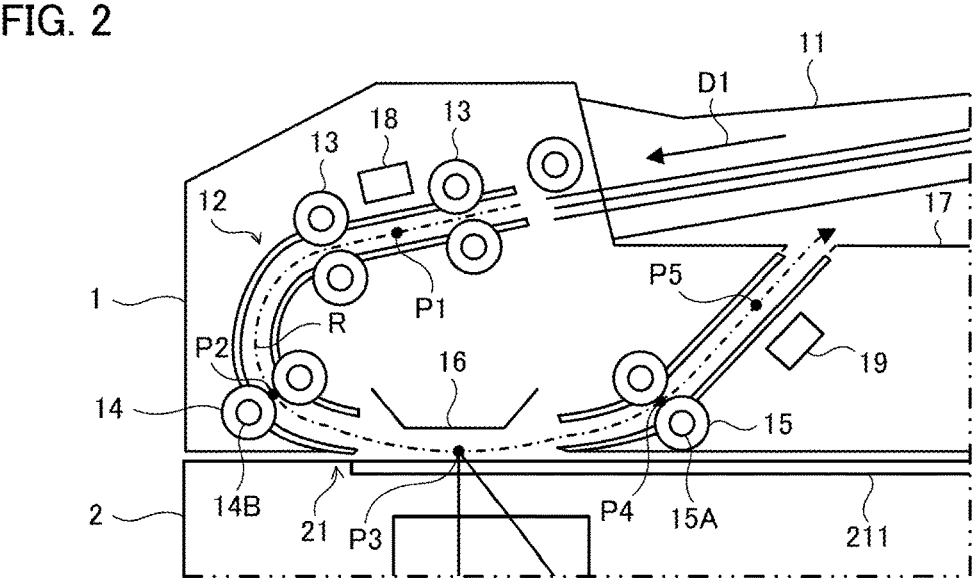
FIG. 2 illustrates a structure of an ADF of the image processing apparatus according to the embodiment of the present disclosure.
Figures 3, 4:
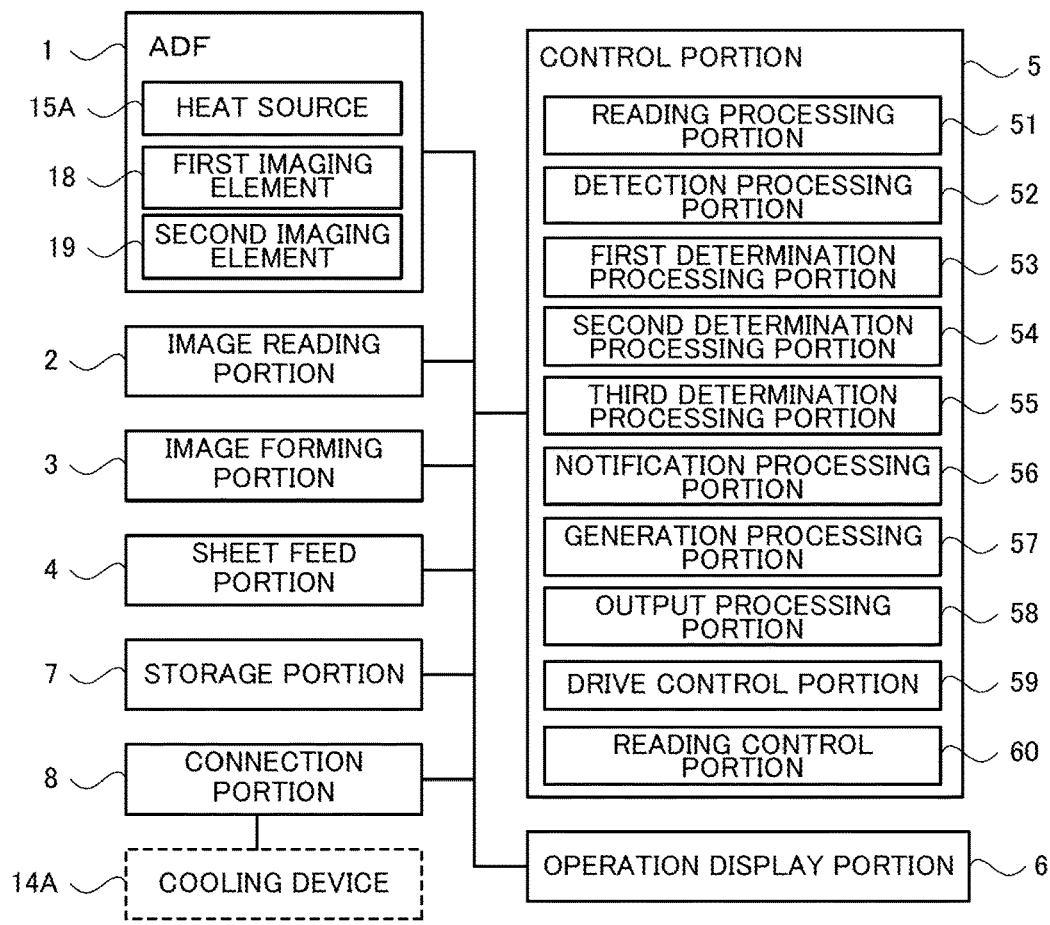
FIG. 3 is a block diagram showing a system configuration of the image processing apparatus according to the embodiment of the present disclosure.
FIG. 4 is a diagram showing an example of a first image read by the image processing apparatus according to the embodiment of the present disclosure.

First, a structure of an image processing apparatus 10 according to the embodiment of the present disclosure will be described with reference to FIGS. 1 to 3. FIG. 1 is a schematic cross-sectional view showing the structure of the image processing apparatus 10. FIG. 2 is a schematic cross-sectional view showing a structure of an ADF 1. In FIG. 2, a feed path R of a document sheet fed by the ADF 1 is shown by an alternate long and short dash line. In FIG. 3, a cooling device 14A that is an external component of the image processing apparatus 10 is shown by a dashed line.

The image processing apparatus 10 is a multifunction peripheral having a plurality of functions such as a facsimile function and a copy function as well as a scan function of reading image data from a document sheet and a print function of forming an image on the basis of image data.

As shown in FIGS. 1 and 3, the image processing apparatus 10 includes an auto document feeder (ADF) 1, an image reading portion 2, an image forming portion 3, a sheet feed portion 4, a control portion 5, an operation display portion 6, and a storage portion 7.

The image forming portion 3 forms an image by electrophotography on the basis of image data. Specifically, the image forming portion 3 includes a photosensitive drum, a charging device, a laser scanning unit, a developing device, a transfer device, a cleaning device, a fixing device, and a sheet discharge tray. The sheet feed portion 4 includes a sheet feed cassette, a sheet feed path, and a plurality of feed rollers, and supplies a sheet to the image forming portion 3. The image forming portion 3 forms an image based on image data, on the sheet supplied from the sheet feed portion 4. The sheet on which an image has been formed by the image forming portion 3 is discharged to the sheet discharge tray. The image forming portion 3 may form an image by another image forming method such an inkjet method.

The control portion 5 includes control devices such as a CPU, a ROM, a RAM, and an EEPROM (which are not shown). The CPU is a processor that executes various operational processes. The ROM is a nonvolatile storage medium in which information such as a control program for causing the CPU to execute various processes is stored in advance. The RAM is a volatile storage medium used as a temporary storage memory (working area) for various processes to be executed by the CPU. The EEPROM is a nonvolatile storage medium. In the control portion 5, various control programs stored in advance in the ROM are executed by the CPU. Thus, the image processing apparatus 10 is comprehensively controlled by the control portion 5. It is noted that the control portion 5 may be configured from an electronic circuit such as an integrated circuit (ASIC), or may be a control portion provided separately from a main control portion that comprehensively controls the image processing apparatus 10.

The operation display portion 6 has: a display portion, such as a liquid crystal display, which displays various kinds of information in accordance with control instructions from the control portion 5; and an operation portion, such as an operation key or a touch panel, which inputs various kinds of information to the control portion 5 in accordance with user's operations.

The storage portion 7 is a storage device such as a solid-state drive (SSD) or a hard disk drive (HDD). For example, in the storage portion 7, image data read by the image reading portion 2 is stored. The storage portion 7 may be the EEPROM of the control portion 5, or the like.

The ADF 1 feeds a document sheet placed on a document sheet placement portion 11 shown in FIGS. 1 and 2. Specifically, as shown in FIGS. 1 and 2, the ADF 1 includes the document sheet placement portion 11, a feed path 12, feed rollers 13 to 15, a document sheet guide 16, and a sheet discharge portion 17. The ADF 1 is supported in an openable and closable manner with respect to a document sheet table 21 described below, thus also serving as a document sheet cover for a document sheet placed on a contact glass 211 of the document sheet table 21. Here, the ADF 1 is an example of a feeding portion in the present disclosure.

A document sheet is placed on the document sheet placement portion 11. The feed path 12 is a path through which the document sheet fed by the ADF 1 is moved, and is formed by a pair of feed guide members. The feed rollers 13 to 15 are provided in the feed path 12. The feed rollers 13 to 15 being driven by a motor (not shown) feed a document sheet placed on the document sheet placement portion 11 in a feeding direction D1 shown in FIG. 2. The document sheet guide 16 guides a document sheet fed by a feed roller 14 onto the contact glass 211 of the document sheet table 21. The document sheet fed by the feed rollers 13 to 15 is discharged to the sheet discharge portion 17.

The image reading portion 2 reads images from the document sheet fed by the ADF 1 and the document sheet placed on the contact glass 211. Specifically, as shown in FIG. 1, the image reading portion 2 includes the document sheet table 21, a reading unit 22, a mirror 23, a mirror 24, an optical lens 25, and a CCD 26.

The document sheet table 21 is provided on an upper surface of a housing of the image processing apparatus 10. As shown in FIG. 1, the document sheet table 21 includes the contact glass 211. A document sheet is placed on the contact glass 211.

As shown in FIG. 1, the reading unit 22 is provided below the contact glass 211. The reading unit 22 can be moved in a sub-scanning direction (the right-left direction of the sheet surface of FIG. 1) by a movement mechanism (not shown) with a drive portion such as a stepping motor. As shown in FIG. 1, the reading unit 22 includes a light source 221 and a mirror 222.

The light source 221 is implemented by a plurality of white LEDs arranged along a main scanning direction (the depth direction of the sheet surface of FIG. 1). The light source 221 emits one line, in the main scanning direction, of white light toward the contact glass 211. The light emitted from the light source 221 passes through the contact glass 211, and is applied to a document sheet placed on the contact glass 211 or a document sheet fed by the ADF 1. The mirror 222 reflects, toward the mirror 23, light emitted from the light source 221 and reflected by the document sheet.

In the image reading portion 2, when image data is read from a document sheet placed on the contact glass 211, the reading unit 22 is moved by the movement mechanism in the sub-scanning direction. Thus, light emitted from the light source 221 and applied to the document sheet is scanned in the sub-scanning direction. In the image reading portion 2, when image data is read from a document sheet fed by the ADF 1, the reading unit 22 is moved by the movement mechanism to a position opposed to the document sheet guide 16 of the ADF 1. Thus, the light emitted from the light source 221 and passing through the contact glass 211 is applied to the document sheet fed by the ADF 1. Here, a light application position P3 (see FIG. 2), to which light is applied by the reading unit 22, in the feed path R of a document sheet fed by the ADF 1 is an example of a second reading position in the present disclosure. The image reading portion 2 is an example of a second image reading portion in the present disclosure. Hereinafter, an image read by the image reading portion 2 is referred to as a second image.

The mirror 23 reflects, toward the mirror 24, light reflected by the mirror 222 of the reading unit 22. The mirror 24 reflects, toward the optical lens 25, light reflected by the mirror 23. The optical lens 25 converges light reflected by the mirror 24 and causes the converged light to enter the CCD 26.

The CCD 26 is an image sensor having a plurality of photoelectric conversion elements arranged along the main scanning direction. The CCD 26 outputs an electric signal corresponding to an amount of received light. In the image reading portion 2, light emitted from the light source 221 and reflected by a document sheet enters the CCD 26 through the mirror 222, the mirror 23, the mirror 24, and the optical lens 25. Thus, an analog electric signal corresponding to an image of a document sheet is outputted from the CCD 26. The analog electric signal outputted from the CCD 26 is converted into a digital electric signal (image data) by an analog front end circuit (not shown) and the converted signal is inputted to the control portion 5.

In the image processing apparatus 10, images are read from various types of document sheets. For example, in the image processing apparatus 10, an image may be read from a document sheet, of a text, produced using a writing instrument that enables erasing of writing by heating. Conventionally, a device is known which is capable of determining whether or not the writing instrument has been used for producing the document sheet, on the basis of a result of comparison between an image read from the document sheet having been heated and an image read from the document sheet which has not been heated yet.

Incidentally, a document may be tampered with using the writing instrument. Even though the above-described device allows a user to recognize whether or not the writing instrument has been used for producing the document, the above-described device does not allow the user to recognize whether or not writing formed using the writing instrument has been erased and then the document has been changed. Therefore, the above-described device does not allow the user to determine whether or not change in the document after erasing of writing amounts to tampering of the document.

On the other hand, the image processing apparatus 10 according to the embodiment of the present disclosure is capable of providing the user with information for determining whether or not the document has been tampered with as described below.

Specifically, as shown in FIG. 3, the image processing apparatus 10 includes a connection portion 8. As shown in FIGS. 2 and 3, the ADF 1 includes a heat source 15A, a first imaging element 18, and a second imaging element 19.

As shown in FIG. 2, the first imaging element 18 is provided upstream in the feeding direction D1 with respect to a light application position P3 in the feed path R, and reads an image of a document sheet fed by the ADF 1. Specifically, the first imaging element 18 is an image sensor, such as a CIS, that includes a light-emitting portion and a light-receiving portion. The light-emitting portion of the first imaging element 18 emits light toward the feed path R. The light-receiving portion of the first imaging element 18 receives light emitted from the light-emitting portion of the first imaging element 18 and reflected by the document sheet fed by the ADF 1, and outputs an electric signal corresponding to a light reception amount. The electric signal outputted from the light-receiving portion of the first imaging element 18 is converted by the analog front end circuit (not shown) into a digital electric signal (image data), and the converted signal is inputted to the control portion 5. Here, a light application position P1 (see FIG. 2), in the feed path R, to which light is applied by the light-emitting portion of the first imaging element 18 is an example of a first reading position in the present disclosure. In addition, the first imaging element 18 is an example of a first image reading portion in the present disclosure. Hereinafter, an image read by the first imaging element 18 is referred to as a first image.

The connection portion 8 is an interface to which the cooling device 14A (see FIG. 3) that is an option unit of the image processing apparatus 10 is connected. The cooling device 14A cools, to a predetermined first temperature, the feed roller 14 (see FIG. 2) provided downstream in the feeding direction D1 with respect to the light application position P1 in the feed path R and upstream in the feeding direction D1 with respect to the light application position P3. For example, the cooling device 14A cools, to the first temperature, the feed roller 14 using a coolant. The cooling device 14A may be provided inside the ADF 1.

The first temperature is a temperature that allows appearance of writing formed using the writing instrument and erased by heating. That is, the first temperature is a temperature at which the color of ink used for the writing instrument is changed from being colorless to being colored. For example, the first temperature is minus 20° C.

For example, in the feed roller 14, a main body portion and a shaft portion are formed using metal in an integral manner. In addition, a through hole 14B along the main scanning direction is provided in the shaft portion of the feed roller 14. A pipe, made of metal, that forms a part of a circulation path of the coolant is inserted through the through hole 14B. The cooling device 14A cools the feed roller 14 by circulating the coolant in the circulation path including the pipe.

The document sheet fed by the ADF 1 is cooled to the first temperature by being in contact with the feed roller 14 that has been cooled to the first temperature by the cooling device 14A. Here, a placement position P2 (see FIG. 2), in the feed path R, at which the feed roller 14 is positioned is an example of a cooling position in the present disclosure. In addition, the feed roller 14 and the cooling device 14A are an example of a cooling portion in the present disclosure.

The heat source 15A is provided inside the feed roller 15 (see FIG. 2) provided downstream in the feeding direction D1 with respect to the light application position P3 in the feed path R. The heat source 15A heats the feed roller 15 to a second temperature higher than the first temperature. For example, the heat source 15A is an IH heater or a halogen heater.

The second temperature is a temperature that enables erasing of writing formed using the writing instrument. That is, the second temperature is a temperature at which the color of ink used for the writing instrument is changed from being colored to being colorless. For example, the second temperature is 50° C.

The document sheet fed by the ADF 1 is heated to the second temperature by being in contact with the feed roller 15 that has been heated to the second temperature by the heat source 15A. Here, a placement position P4 (see FIG. 2), in the feed path R, at which the feed roller 15 is placed is an example of a heating position in the present disclosure. In addition, the feed roller 15 and the heat source 15A are an example of a heating portion in the present disclosure.

As shown in FIG. 2, the second imaging element 19 is provided downstream in the feeding direction D1 with respect to the placement position P4, in the feed path R, of the feed roller 15, and reads an image of the document sheet fed by the ADF 1. Specifically, the second imaging element 19 is an image sensor, such as a CIS, that includes a light-emitting portion and a light-receiving portion similarly to the first imaging element 18. Here, a light application position P5 (see FIG. 2), in the feed path R, to which light is applied by the light-emitting portion of the second imaging element 19 is an example of a third reading position in the present disclosure. In addition, the second imaging element 19 is an example of a third image reading portion in the present disclosure. Hereinafter, an image read by the second imaging element 19 is referred to as a third image.

The image processing apparatus 10 may not include the heat source 15A and the second imaging element 19.

Meanwhile, a change detection program for causing the CPU to execute a change detection process described below (see a flowchart of FIG. 8) is stored in advance in the ROM of the control portion 5. The change detection program may be stored in a non-transitory computer-readable storage medium such as a CD, a DVD, or a flash memory, and may be read from the storage medium and installed into the EEPROM of the control portion 5.

As shown in FIG. 3, the control portion 5 includes a reading processing portion 51, a detection processing portion 52, a first determination processing portion 53, a second determination processing portion 54, a third determination processing portion 55, a notification processing portion 56, a generation processing portion 57, an output processing portion 58, a drive control portion 59, and a reading control portion 60. Specifically, the control portion 5 causes the CPU to execute the change detection program stored in the ROM. As a result, the control portion 5 functions as the reading processing portion 51, the detection processing portion 52, the first determination processing portion 53, the second determination processing portion 54, the third determination processing portion 55, the notification processing portion 56, the generation processing portion 57, the output processing portion 58, the drive control portion 59, and the reading control portion 60. Here, a device that includes the ADF 1, the image reading portion 2, the control portion 5, and the cooling device 14A is an example of an image reading device in the present disclosure. In addition, a device that includes the ADF 1, the image reading portion 2, the image forming portion 3, the control portion 5, and the cooling device 14A is an example of an image forming apparatus in the present disclosure. The present disclosure is applicable to an image reading device or an image forming apparatus such as a scanner device, a facsimile device, and a copy machine.

The reading processing portion 51 executes a reading process of reading the first image, the second image, and the third image from the document sheet fed by the ADF 1 in a state where the cooling device 14A and the heat source 15A are driven.

Specifically, in a case where instruction for executing the reading process is provided by a user's operation in the operation display portion 6, the reading processing portion 51 drives the cooling device 14A to lower, by cooling, the temperature of the feed roller 14 to the first temperature, and drives the heat source 15A to raise, by heating, the temperature of the feed roller 15 to the second temperature. For example, the reading processing portion 51 controls driving of the cooling device 14A by using a temperature sensor (not shown) capable of detecting the temperature of the feed roller 14. In addition, the reading processing portion 51 controls driving of the heat source 15A by using the temperature sensor (not shown) capable of detecting the temperature of the feed roller 15.

After the temperature of the feed roller 14 has become the first temperature and the temperature of the feed roller 15 has become the second temperature, the reading processing portion 51 executes the reading process by using the ADF 1, the first imaging element 18, the image reading portion 2, and the second imaging element 19.

FIG. 4 shows an example of the first image read from a document sheet by the reading process. Underlined parts in a first image G10 shown in FIG. 4 are writing formed using the writing instrument. Specifically, in the first image G10, descriptions in a date portion, a cell for an item name, a cell for a unit price, and a cell for a quantity are writing formed using the writing instrument.

FIG. 5 shows an example of the second image read from the document sheet by the reading process. A second image G20 shown in FIG. 5 is an image read, by the reading process, from the same document sheet as the document sheet from which the first image G10 has been read. In the second image G20, when the document sheet has been cooled to the first temperature by the feed roller 14, writing which has been erased by heating after being formed using the writing instrument appears. Therefore, in the second image G20, writing (the writing appearing in the first image G10) formed so as to overlap writing erased by heating, and writing that has appeared by cooling overlap each other. Specifically, in the second image G20, writings appear in an overlapped manner in the date portion and the cell for the quantity.

FIG. 6 shows an example of the third image read from the document sheet by the reading process. A third image G30 shown in FIG. 6 is an image read, by the reading process, from the same document sheet as the document sheet from which the first image G10 and the second image G20 have been read. In the third image G30, writing formed using the writing instrument is erased by heating the document sheet to the second temperature by the feed roller 15.

The detection processing portion 52 detects a difference image that is different from the first image and that is included in the second image.

For example, the detection processing portion 52 detects, as a difference pixel, a pixel, included in the second image, which has a density value which is different, by a value greater than a predetermined threshold value, from a density value of a corresponding pixel in the first image. For example, the threshold is set on the basis of variation among light emitting intensities of the light source 221 of the image reading portion 2, variation among light reception sensitivities of the CCD 26, variation among light emitting intensities of the light-emitting portion of the first imaging element 18, variation among light reception sensitivities of the light-receiving portion of the first imaging element 18, and the like.

The detection processing portion 52 detects, as the difference image, a rectangular region that includes the difference pixels that are continuous with each other in the second image. For example, the detection processing portion 52 recognizes, as the continuous difference pixels, the two difference pixels present in a predetermined range. For example, the predetermined range is a square range of 5 pixels×5 pixels. The detection processing portion 52 detects, as the difference pixel, a region wider that is than the smallest rectangular region including the continuous difference pixels, by a predetermined number of pixels. For example, the predetermined number of pixels is 5. The detection processing portion 52 recognizes, as the single difference image, each of the adjacent difference images. The predetermined range and the predetermined number of pixels may be optionally changed in accordance with the user's operation.

Figure 7:
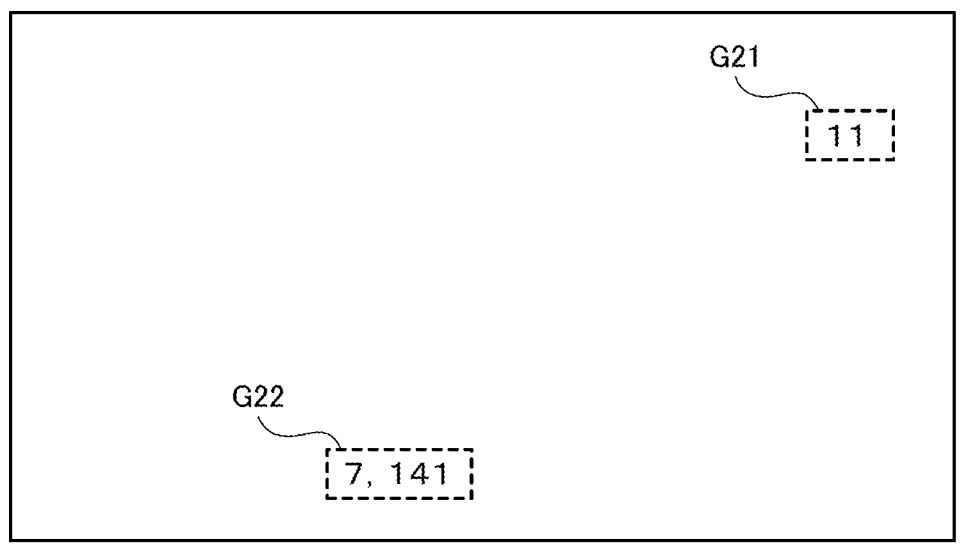
FIG. 7 is a diagram showing an example of a difference image detected by the image processing apparatus according to the embodiment of the present disclosure.

FIG. 7 shows an example of the difference image detected by the detection processing portion 52. Difference images G21 and G22 shown in FIG. 7 are each the difference image detected from the second image G20. FIG. 7 shows each of the regions of the difference images G21 and G22 by a dashed line.

The first determination processing portion 53 determines whether or not the difference image includes a character or a number.

Specifically, the first determination processing portion 53 executes an optical character recognition (OCR) process of recognizing a character included in the difference image, for each of the difference images detected by the detection processing portion 52. The first determination processing portion 53 thus determines whether or not the difference image includes a character or a number, on the basis of the execution result of the OCR process.

A part of a line forming a character or a number that is included in the difference image may be missing because of overlapping, in the document sheet, of writing erased by heating after being formed using the writing instrument and writing formed thereover writing. Therefore, the first determination processing portion 53 executes, before executing the OCR process, an interpolation process of interpolating a missing place of the line in the difference image. For example, in the interpolation process, a pixel having the same density as the difference pixel is inserted between the two difference pixels recognized by the detection processing portion 52 as being continuous with each other. Thus, the accuracy of recognizing a character or a number by the OCR process can be improved.

The second determination processing portion 54 determines whether or not a predetermined specific word is included in the difference image determined by the first determination processing portion 53 to include a character.

For example, in the image processing apparatus 10, the specific words are stored in advance in the storage portion 7. For example, the specific word is a word that was tampered with in each of the cases, of tampering of documents, which actually occurred. In a case where a word included in the difference image is stored in the storage portion 7 as the specific word, the second determination processing portion 54 determines that the difference image includes the specific word. The second determination processing portion 54 may inquire of an external server including a storage portion that stores the specific word whether the word included in the difference image corresponds to the specific word.

The third determination processing portion 55 determines whether or not a predetermined related word that is related to the specific word is included in a reference region, on the first image, that corresponds to a placement region, on the second image, of the difference image determined by the second determination processing portion 54 to include the specific word.

For example, in the image processing apparatus 10, the related words corresponding to the specific words, respectively, are stored in advance in the storage portion 7. For example, the related word is a word having the opposite meaning of the specific word, such as "success" in the case where the specific word is "failure".

For example, the third determination processing portion 55 executes the OCR process on the reference region. In a case where a word that is included in the reference region and recognized as a result of the OCR process is stored in the storage portion 7 as the related word corresponding to the specific word, the third determination processing portion 55 determines that the reference region includes the related word. The third determination processing portion 55 may inquire of an external server including a storage portion that stores the related words corresponding to the specific words, respectively, whether or not a word included in the reference region corresponds to the related word.

In a case where the difference image has been detected by the detection processing portion 52, the notification processing portion 56 provides a notification of the detection. For example, the notification processing portion 56 causes the operation display portion 6 to display a message indicating that the difference image has been detected, and provides a notification that the difference image has been detected.

The notification processing portion 56 provides a notification that the difference image has been detected, and causes the operation display portion 6 to display the difference image. Here, the operation display portion 6 is an example of a display portion in the present disclosure.

In addition, the notification processing portion 56 causes the difference image determined by the first determination processing portion 53 to include a number, to be displayed in a predetermined display mode. For example, the notification processing portion 56 changes the color of the number included in the difference image to a predetermined color. The notification processing portion 56 may display, by blinking, the number included in the difference image. The notification processing portion 56 may change a font of the number included in the difference image or the size of the character included therein. The display mode may be optionally changed in accordance with the user's operation.

In addition, the notification processing portion 56 causes the difference image corresponding to the reference region determined by the third determination processing portion 55 to include the related word, to be displayed in the display mode.

The notification processing portion 56 may cause the difference image determined by the first determination processing portion 53 to include a number and the difference image determined by the second determination processing portion 54 to include the specific word, to be displayed in the display mode. The notification processing portion 56 may cause the difference image determined by the first determination processing portion 53 to include a character or a number, to be displayed in the display mode.

The generation processing portion 57 generates a superimposed image obtained by superimposing the difference image onto a replacement region, in the third image, that corresponds to a placement region of the difference image on the second image.

The generation processing portion 57 may generate a second superimposed image obtained: by detecting a second difference image, included in the first image, that is different from the third image; superimposing the second difference image onto a region, except for the replacement region, which is in the third image and which corresponds to a placement region of the second difference region on the first image; and superimposing the difference image onto the replacement region.

The output processing portion 58 outputs the first image read from a document sheet by the reading process. For example, the output processing portion 58 prints and outputs the first image. The output processing portion 58 may cause the storage portion 7 to store image data corresponding to the first image.

The output processing portion 58 outputs the superimposed image generated by the generation processing portion 57. For example, the output processing portion 58 prints and outputs the superimposed image. The output processing portion 58 may cause the storage portion 7 to store image data corresponding to the superimposed image.

The drive control portion 59 stops driving of the cooling device 14A in a case where the reading process has been finished, and stops driving of the heat source 15A after a predetermined heating time period has elapsed since the stop of the driving of the cooling device 14A. For example, the heating time period is three minutes. The heating time period may be optionally changed in accordance with the user's operation.

The reading control portion 60 prohibits reading of an image of a document sheet fed by the ADF 1 in a time period from finishing of the reading process to stop of driving of the heat source 15A.

The control portion 5 may not include some or the entirety of the first determination processing portion 53, the second determination processing portion 54, the third determination processing portion 55, the generation processing portion 57, the output processing portion 58, the drive control portion 59, and the reading control portion 60.

Change Detection Process

Figure 8:
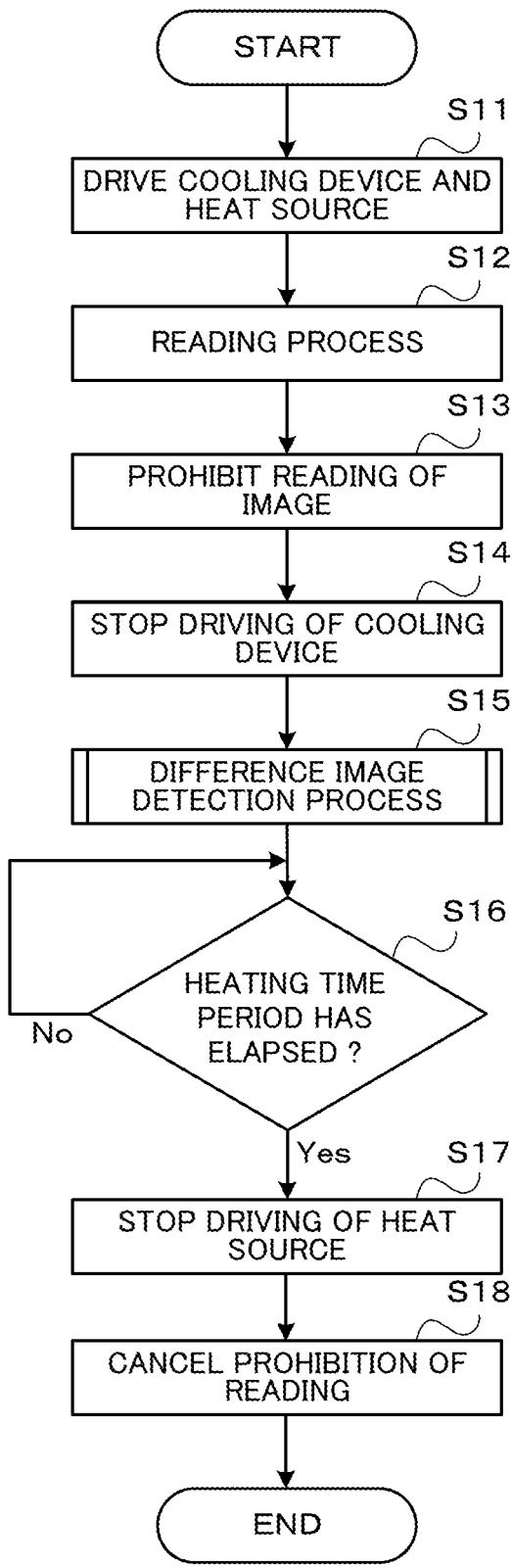
FIG. 8 is a flowchart showing an example of a change detection process executed by the image processing apparatus according to the embodiment of the present disclosure.

Hereinafter, both an example of the procedure of the change detection process executed by the control portion 5 in the image processing apparatus 10 and an image reading method in the present disclosure will be described with reference to FIG. 8. Here, steps S11, S12, . . . represent numbers of process procedures (steps) executed by the control portion 5. The change detection process is executed in a case where instruction for executing the reading process is provided by the user's operation in the operation display portion 6.

Step S11

First, in step S11, the control portion 5 drives the cooling device 14A to lower, by cooling, the temperature of the feed roller 14 to the first temperature, and drives the heat source 15A to raise, by heating, the temperature of the feed roller 15 to the second temperature.

Step S12

In step S12, the control portion 5 executes the reading process by using the ADF 1, the first imaging element 18, the image reading portion 2, and the second imaging element 19. Thus, the first image, the second image, and the third image are read from a document sheet. The document sheet in which writing formed using the writing instrument has been erased is discharged to the sheet discharge portion 17. Here, process steps of step S11 and step S12 are executed by the reading processing portion 51 of the control portion 5.

Step S13

In step S13, the control portion 5 prohibits reading of an image of a document sheet fed by the ADF 1.

Step S14

In step S14, the control portion 5 stops driving of the cooling device 14A. Meanwhile, the control portion 5 continues driving of the heat source 15A. Thus, moisture attached to the feed path 12, the first imaging element 18, and the second imaging element 19 due to dew condensation caused by cold air of the cooling device 14A is evaporated by heat of the heat source 15A.

Step S15

In step S15, the control portion 5 executes a difference image detection process described below.

Step S16

In step S16, the control portion 5 determines whether or not the heating time period has elapsed since stopping of driving of the cooling device 14A in step S14.

If the control portion 5 determines that the heating time period has elapsed since stopping of driving of the cooling device 14A (Yes in S16), the control portion 5 advances the processing to step S17. If the heating time period has not elapsed since stopping of driving of the cooling device 14A (No in S16), the control portion 5 waits for elapse of the heating time period in step S16.

Step S17

In step S17, the control portion 5 stops driving of the heat source 15A. Here, process steps of step S14, step S16, and step S17 are executed by the drive control portion 59 of the control portion 5.

Step S18

In step S18, the control portion 5 cancels prohibition, in step S13, of reading of an image of a document sheet fed by the ADF 1. Here, process steps of step S13 and step S18 are executed by the reading control portion 60 of the control portion 5.

Thus, reading of the document sheet is restricted during a time when moisture attached to the feed path 12, the first imaging element 18, and the second imaging element 19 remains due to dew condensation caused by cold air of the cooling device 14A. Therefore, occurrence of paper jam in the feed path 12, due to moisture attached to the feed path 12, is suppressed. In addition, decrease in the quality of a read image, due to moisture attached to the first imaging element 18 and the second imaging element 19, is suppressed.

In the change detection process, process steps of step S13, step S16, and step S18 may be omitted.

Difference Image Detection Process

Figure 9:
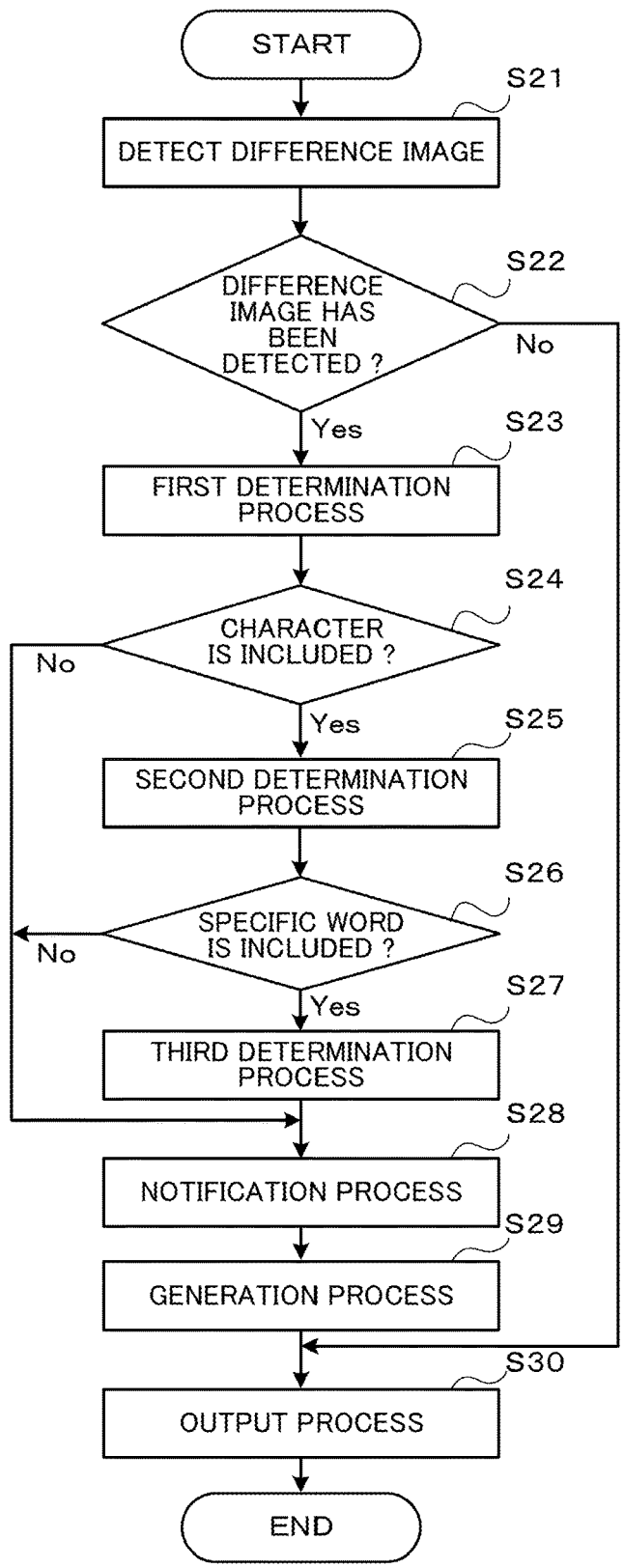
FIG. 9 is a flowchart showing an example of a difference image detection process executed by the image processing apparatus according to the embodiment of the present disclosure.

Next, the difference image detection process executed in step S15 of the change detection process will be described with reference to FIG. 9.

Step S21

First, in step S21, the control portion 5 detects the difference image included in the second image read by the reading process. Here, the process step of step S21 is an example of a detection step in the present disclosure, and is executed by the detection processing portion 52 of the control portion 5.

Step S22

In step S22, the control portion 5 determines whether or not the difference image has been detected in step S21.

If the control portion 5 determines that the difference image has been detected in step S21 (Yes in S22), the control portion 5 advances the processing to step S23. If the difference image has not been detected in step S21 (No in S22), the control portion 5 advances the processing to step S30.

Step S23

In step S23, the control portion 5 executes a first determination process of determining whether or not the difference image detected in step S21 includes a character or a number. Here, the process step of step S23 is executed by the first determination processing portion 53 of the control portion 5.

Step S24

In step S24, the control portion 5 determines whether or not inclusion of a character in the difference image has been determined by the first determination process executed in step S23.

If the control portion 5 determines that inclusion of a character in the difference image has been determined by the first determination process (Yes in S24), the control portion 5 advances the processing to step S25. If inclusion of a character in the difference image is not determined by the first determination process (No in S24), the control portion 5 advances the processing to step S28.

Step S25

In step S25, the control portion 5 executes a second determination process of determining whether or not the difference image detected in step S21 includes the specific word. Here, the process step of step S25 is executed by the second determination processing portion 54 of the control portion 5.

Step S26

In step S26, the control portion 5 determines whether or not inclusion of the specific word in the difference images has been determined by the second determination process executed in step S25.

If the control portion 5 determines that inclusion of the specific word in the difference image has been determined by the second determination process (Yes in S26), the control portion 5 advances the processing to step S27. If inclusion of the specific word in the difference image is not determined by the second determination process (No in S26), the control portion 5 advances the processing to step S28.

Step S27

In step S27, the control portion 5 executes a third determination process of determining whether or not the related word is included in the reference region, on the first image read by the reading process, that corresponds to the placement region, on the second image, of the difference image detected in step S21. Here, the process step of step S27 is executed by the third determination processing portion 55 of the control portion 5.

Step S28

In step S28, the control portion 5 causes the operation display portion 6 to display a message indicating that the difference image has been detected, and provides a notification that the difference image has been detected. Here, the process step of step S28 is an example of a notification step in the present disclosure, and is executed by the notification processing portion 56 of the control portion 5.

The control portion 5 provides a notification that the difference image has been detected, and causes the operation display portion 6 to display the difference image. This allows the user of the image processing apparatus 10 to check, by viewing the difference image displayed on the operation display portion 6, the content of writing that has been erased by heating after being formed using the writing instrument on a document sheet.

In addition, the control portion 5 changes the color of a number included in the difference image determined by the first determination process executed in step S23 to include the number, to a predetermined color. The control portion 5 changes the color of the specific word included in the difference image corresponding to the reference region determined by the third determination process executed in step S27 to include the related word, to a predetermined color. Thus, a suspected tampered portion in the document sheet is displayed by highlighting the portion. Therefore, labor of a user who attempts to find out a suspected tampered portion in the text is reduced.

Step S29

In step S29, the control portion 5 generates the superimposed image obtained by superimposing the difference image onto the replacement region in the third image read by the reading process. Here, the process step of step S29 is executed by the generation processing portion 57 of the control portion 5.

Step S30

In step S30, the control portion 5 prints and outputs the first image read by the reading process. Here, the process step of step S30 is executed by the output processing portion 58 of the control portion 5. This allows the user to obtain a copy of a document sheet in the state where the reading process has not been executed yet, instead of the document sheet, to be discharged to the sheet discharge portion 17, in which writing formed using the writing instrument has been erased. That is, the user can be prevented from losing the document sheet in the state where the reading process has not been executed yet.

In a case where the process step of step S29 has been executed, the control portion 5 prints and outputs the superimposed image generated in step S29. This allows the user to obtain a copy of the document sheet in the state where writing formed using the writing instrument has not yet been erased and changed by heating.

In the difference image detection process, some or the entirety of process steps of step S23 to step S27, and step S29 to step S30 may be omitted.

As described above, in the image processing apparatus 10, in a case where the difference image, different from the first image read before cooling of a document sheet, that is included in the second image read after cooling of the document sheet has been detected, a notification thereof is provided. This allows the user to recognize that writing formed using the writing instrument has been erased and a text has been changed. Therefore, the image processing apparatus 10 is capable of providing the user with information for determining whether or not a text has been tampered with.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a feeding portion configured to feed a document sheet;
   a first image reading portion configured to read an image of the document sheet at a predetermined first reading position in a feed path of the document sheet fed by the feeding portion;
   a cooling portion configured to cool the document sheet to a predetermined first temperature at a cooling position downstream in a feeding direction in which the document sheet is fed by the feeding portion, with respect to the first reading position in the feed path;
   a second image reading portion configured to read an image of the document sheet at a second reading position downstream in the feeding direction with respect to the cooling position in the feed path;
   a detection processing portion configured to detect a difference image different from a first image read by the first image reading portion, the difference image being included in a second image read by the second image reading portion; and
   a notification processing portion configured to, in a case where the difference image has been detected by the detection processing portion, provide a notification that the difference image has been detected.

2. The image reading device according to claim 1, wherein the notification processing portion provides the notification that the difference image has been detected, and causes a display portion to display the difference image.

3. The image reading device according to claim 2, further comprising a first determination processing portion configured to determine whether or not the difference image includes a character or a number, wherein
   the notification processing portion causes the difference image to be displayed in a predetermined display mode, the difference image having been determined by the first determination processing portion to include a character or a number.

4. The image reading device according to claim 3, further comprising a second determination processing portion configured to determine whether or not the difference image includes a predetermined specific word, the difference image having been determined by the first determination processing portion to include a character, wherein
   the notification processing portion causes the difference image determined by the first determination processing portion to include a number and the difference image determined by the second determination processing portion to include the specific word, to be displayed in the display mode.

5. The image reading device according to claim 4, further comprising a third determination processing portion configured to determine whether or not a reference region, on the first image, that corresponds to a placement region, on the second image, of the difference image includes a predetermined related word that is related to the specific word, the difference image having been determined by the second determination processing portion to include the specific word, wherein
   the notification processing portion causes the difference image corresponding to the reference region to be displayed in the display mode, the reference region having been determined by the third determination processing portion to include the related word.

6. The image reading device according to claim 1, further comprising:
   a heating portion configured to heat the document sheet, to a second temperature higher than the first temperature, at a heating position downstream in the feeding direction with respect to the second reading position in the feed path;
   a third image reading portion configured to read an image of the document sheet at a third reading position downstream in the feeding direction with respect to the heating position in the feed path;
   a generation processing portion configured to generate a superimposed image obtained by superimposing the difference image onto a replacement region in a third image read by the third image reading portion, the replacement region corresponding to a placement region of the difference image on the second image; and
   an output processing portion configured to output the superimposed image generated by the generation processing portion.

7. The image reading device according to claim 6, further comprising:
   a drive control portion configured to stop driving of the cooling portion in a case where a reading process, of reading the first image, the second image, and the third image from the document sheet fed by the feeding portion in a state where the cooling portion and the heating portion are driven, has been finished, and stop driving of the heating portion after a predetermined heating time period has elapsed since stopping of driving of the cooling portion; and
   a reading control portion configured to prohibit reading of an image of the document sheet fed by the feeding portion in a time period from finishing of the reading process to stop of driving of the heating portion.

8. An image forming apparatus comprising:
   the image reading device according to claim 1; and
   an image forming portion configured to form an image on the basis of image data.

9. An image reading method executed by an image reading device that includes a feeding portion configured to feed a document sheet, a first image reading portion configured to read an image of the document sheet at a predetermined first reading position in a feed path of the document sheet fed by the feeding portion, a cooling portion configured to cool the document sheet to a predetermined first temperature at a cooling position downstream in a feeding direction in which the document sheet is fed by the feeding portion, with respect to the first reading position in the feed path, and a second image reading portion configured to read an image of the document sheet at a second reading position downstream in the feeding direction with respect to the cooling position in the feed path, the image reading method comprising:
   a detection step of detecting a difference image different from a first image read by the first image reading portion, the difference image being included in a second image read by the second image reading portion; and a notification step of, in a case where the difference image has been detected in the detection step, providing a notification that the difference image has been detected.

\* \* \* \* \*